United States Patent
Jorach et al.

(10) Patent No.: US 6,505,601 B1
(45) Date of Patent: Jan. 14, 2003

(54) METHOD FOR OPERATING A RECIPROCATING-PISTON INTERNAL COMBUSTION ENGINE

(75) Inventors: Rainer Werner Jorach, Remseck-Aldlingen (DE); Gerhard König, Lauterstein (DE); Alois Raab, Böbingen a.d. Rems (DE); Eckart Schloz, Marbach (DE); Petra Stapf, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 227 days.

(21) Appl. No.: 09/708,848

(22) Filed: Nov. 8, 2000

(30) Foreign Application Priority Data

Nov. 10, 1999 (DE) .......................... 199 53 932

(51) Int. Cl.$^7$ .............................. F02B 17/00
(52) U.S. Cl. ................... 123/295; 123/299; 123/305
(58) Field of Search ................. 123/294, 295, 123/299, 305, 430

(56) References Cited

U.S. PATENT DOCUMENTS

| | | | | |
|---|---|---|---|---|
| 4,052,973 A | * | 10/1977 | Clauser | 123/32 ST |
| 5,609,131 A | * | 3/1997 | Gray et al. | 123/299 |
| 6,386,177 B2 | * | 5/2002 | Urushihara et al. | 123/299 |
| 6,401,688 B2 | * | 6/2002 | Teraji et al. | 123/295 |
| 6,412,469 B1 | * | 7/2002 | Itoyama et al. | 123/299 |

FOREIGN PATENT DOCUMENTS

| | | |
|---|---|---|
| DE | 43 33 617 | 4/1994 |
| DE | 195 16 245 | 11/1996 |
| EP | 0 886 050 | 12/1998 |

* cited by examiner

Primary Examiner—John Kwon
(74) Attorney, Agent, or Firm—Kenyon & Kenyon

(57) ABSTRACT

A method for operating a reciprocating-piston internal combustion engine with direct fuel injection. Injecting fuel in a lower part-load range, for the formation of a heterogeneous mixture, with a higher injection pressure centrally into a working space or a piston recess shortly before top dead center, or, optionally, in the case of very early injection (crank angle of 180° to 20° before top dead center), forming locally an ignitable homogeneous mixture with homogeneous combustion by defined charge stratification, controlled air movement in the cylinder and injection pressure combined with timed injection; injecting fuel in a middle part-load range, for a formation of a homogeneous mixture, with a lower injection pressure in a phase with a crank angle of 180° to 20° before top dead center; and injecting part of the fuel, in an upper part-load range (23) and/or full-load range, first, for the formation of a homogeneous mixture, with a lower injection pressure into the working space or the piston recess in a phase with a crank angle of 180° to 20° before top dead center and, injecting the rest of the fuel, for the formation of a heterogeneous mixture, with a higher injection pressure into the working space or the piston recess in a phase around top dead center.

18 Claims, 4 Drawing Sheets

METHOD FOR OPERATING A RECIPROCATING-PISTON INTERNAL COMBUSTION ENGINE

FIELD OF THE INVENTION

The present invention relates to a method for operating a reciprocating-piston internal combustion engine in which an injection nozzle injects fuel directly into a working space which is formed in a cylinder between a cylinder head and a piston.

RELATED TECHNOLOGY

In modem high-speed reciprocating-piston internal combustion engines operating with diesel fuel and auto-ignition, the fuel is injected directly into a working space which usually includes a piston recess. The injected fuel forms a more or less homogeneous mixture of diesel fuel and air, the load of the reciprocating-piston internal combustion engine being regulated by the injected fuel quantity being varied. The fuel/air mixture ignites when there is an ignitable mixture in the working space and when the compression temperature in the working space reaches or exceeds the auto-ignition temperature of the fuel/air mixture.

For complete combustion, the aim is to ensure a good distribution of the fuel with the air charge. When the fuel is distributed homogeneously to the air charge in the working space, so as to give rise to a homogeneous fuel/air mixture, there is the risk, in the lower load range of the reciprocating-piston internal combustion engine, when a small fuel quantity meets a large air charge in the working space, that the ratio of fuel to air does not reach the precondition for ignitability at any location in the working space. On the other hand, in the full-load range of the reciprocating-piston internal combustion engine, when a large quantity of fuel is distributed uniformly to the air charge in the working space, there is the risk that the ignition conditions are reached at many locations in the working space and therefore the fuel bums with a rapid pronounced pressure rise and numerous pressure peaks, thus resulting in knocking combustion.

Efforts have been made to distributed fuel heterogeneously to the air charge in order to achieve a combustion which takes place harmoniously. This gives rise, in the working space, to zones with overenriched fuel/air mixtures which develop into ignitable mixtures due to the air movement in the working space, so that uniform combustion occurs.

SAE Paper 980505, 1998, Hashizume, T., Miyamato, T., Akagawa, H., Tsujimura, K.: Combustion and Emission Characteristics of Multiple Stage Diesel Combustion describes improving the combustion in a reciprocating-piston internal combustion engine by means of a two-phase injection of the fuel. In this case, two injection nozzles are arranged laterally in the combustion space diametrically to one another, and, for the formation of a homogeneous mixture, part of the fuel is injected through these in a first phase, approximately 150–70° before top dead center. In a second phase, the fulel is injected through a centrally arranged conventional six-hole or eight-hole nozzle or through a so-called "micronozzle" having relatively fine nozzle holes for the formation of a heterogeneous mixture around top dead center.

A fuel pump feeds the fulel for the lateral injection nozzles with a first maximum pressure into a first pressure accumulator, whilst a high-pressure generator feeds fuel into a second pressure accumulator with a second maximum pressure which is more than twice as high as the first maximum pressure. Correspondingly, the maximum injection pressure of the central injection nozzle is more than twice as high as the maximum injection pressure of the lateral injection nozzles. However, because of the complex arrangement of the injection nozzles, such a method necessitates a high outlay in structural and control terms.

SAE 1999-01-0185, Iwabuchi, Y., Kawai, K., Shoji, T., Takeda, T.: Trail of New Concept Diesel Combustion System—Premixed Compression-Ignition Combustion-, describes reducing the depth of penetration of injection jets by two nozzle holes in a conventional injection nozzle being in each case arranged in such a way that the injection jets meet one another in a directed manner at a defined distance from the nozzle holes. As a result of the collision of the two injection jets, the momentum of the individual jets is reduced, the diameter of the fuel drops in the jet becomes smaller and a widening of the jet is achieved. As a result, an accretion of the fuel on the cylinder wall is avoided and, at the same time, a greater air volume is covered by the injection jet.

SUMMARY OF THE INVENTION

An object of the present invention is to improve mixture formation at a low outlay in structural terms over the operating range of a reciprocating-piston internal combustion engine with direct fuel injection and to avoid an undesirable accretion of the fuel during a phase for the formation of a homogeneous mixture.

The present invention provides a method for operating a reciprocating-piston internal combustion engine, in which an injection nozzle injects fuel directly into a working space which is formed in a cylinder between a cylinder head and a piston and which comprises a piston recess. In a lower part-load range (21), for the formation of a heterogeneous mixture the fuel is injected with a higher injection pressure (29) centrally into the working space (8) or into the piston recess (6) shortly before top dead center (12) or, optionally, an ignitable homogeneous mixture is formed locally, in the case of very early injection (180° to 20° crank angle (φ) before top dead center), by defined charge stratification, via controlled coordination of air movement in the cylinder (9) and of injection pressure combined with timed injection, in a similar way to the direct-injection petrol engine, so that, even in this load range (21), homogeneous combustion can be produced. In a middle part-load range (22), for the formation of a homogeneous mixture, the fuel is injected with a lower injection pressure (28) in a phase (25) with a one hundred and eighty to twenty degree crank angle (φ) before top dead center (12). In an upper part-load range (23) and/or full-load range (24), for the formation of a homogeneous mixture, part of the fuel is first injected into the working space (8) or the piston recess (6) with a lower injection pressure (28) in a phase (25) with a one hundred and eighty to twenty degree crank angle (φ) before top dead center (12) and, for the formation of a heterogeneous mixture, the rest is injected into the working space (8) or the piston recess (6) with a higher injection pressure (29) in a phase (31, 27) around top dead center (12).

In the method according to the present invention, first, for the formation of a heterogeneous mixture, in a lower part-load range the fuel is injected with a higher pressure centrally into the piston recess shortly before top dead center. This ensures that an ignitable mixture is formed, even when the fuel quantities are low in relation to the air charge. On account of the high compression in the phase at top dead center, despite the higher injection pressure there is no likelihood that fuel will accrete on the walls of the working space, particularly when, according to a refinement of the present invention, an injection nozzle with relatively small hole diameters is used.

Optionally, in the lower load range, an ignitable homogeneous mixture may be formed locally, even when the injection is very early (180° to 20° crank angle before top dead center), by defined charge stratification, via controlled coordination of air movement in the cylinder and injection pressure combined with timed injection, in a similar way to the direct-injection gasoline engine, so that, even in this load range, homogeneous combustion can be produced.

In a subsequent higher part-load range, for the formation of a homogeneous mixture, the fuel is injected with a lower injection pressure in a phase with 180° to 20° crank angle before top dead center. The fuel is thereby distributed uniformly to the air charge in the working space, so that a homogeneous mixture is formed. Due to early injection, sufficient time remains for homogenizing and vaporizing the injected fuel. The lower injection pressure prevents fuel from accreting on the wall of the combustion space at the time of injection in spite of low compression. Here, too, an injection nozzle with relatively small nozzle holes has a positive effect.

In the upper part-load range and in the full load range, when the fulel quantity to be injected is very large in relation to the air charge in the working space, the fuel may be injected in a plurality of phases, specifically, in a first phase with 180° to 20° crank angle before top dead center, at a low injection pressure with the formation of a substantially homogeneous mixture and, in a further phase, at a higher injection pressure for the formation of a heterogeneous mixture in a phase around top dead center. The purpose of this is to ensure that, at the moment when the compression temperature reaches the ignition temperature, there is only a limited quantity of homogeneous ignitable fuel which, on the one hand, allows complete combustion, but, on the other hand, does not give rise to knocking combustion. The fuel injected later burns without local pressure peaks on account of the formation of a heterogeneous mixture.

The different injection pressures during the various injection phases, on the one hand, make it possible to have optimum fuel treatment over the entire operating characteristic map of the internal combustion engine and, on the other hand, prevent fuel from undesirably accreting on the wall of the combustion space. This is particularly important because the fuel is injected only through a central injection nozzle and therefore the free jet travel length is markedly shorter than in the case of injection nozzles arranged laterally. Since only one central injection nozzle needs to be used for each cylinder, the outlay in structural terms is very low.

As an alternative to multi-phase injection in the upper part-load range and full-load range, single-phase injection may also be used in these load ranges. In this case, the fuel is injected at a higher injection pressure shortly before top dead center for the formation of a heterogeneous mixture.

To generate pressure modulation in a working cycle, the following injection systems are optionally available.

a) First Configuration:
Reciprocating-piston pump (for example, insertable or plug-in pump, unit injector, in-line injection pump, distributor injection pump), the piston of which is driven by a camshaft having a double cam and which feeds fuel to the electronically controllable injection valve, a cut-off valve being arranged between the injection pump and the respective injection nozzle.

b) Second Configuration:
CR system, in which there is arranged between the high-pressure accumulator and the electronically controllable injection valve a quick-switching magnetically or piezoelectrically controlled valve, with the aid of which the pressure level in the fuel delivery line to the injection valve can be regulated.

c) Third Configuration:
Electronically controllable injection system with hydraulic pressure boosting (for example, HEUI B by Caterpillar). The oil pressure is switched to a booster piston with the aid of a quick-switching magnetically or piezoelectrically controlled valve (for example, 3/2-way valve). By an appropriate double supply of current to the quick-switching valve, the injection pressure can be varied when different injection events occur.

The injection valves which may be used are those such as are employed in the known common-rail method. The start of injection and the end of injection for the individual injection phases are determined by means of an electronic control device.

When no multi-phase fuel injection takes place, that is to say either only a homogeneous mixture is formed by early fuel injection or a heterogeneous mixture is formed by late fuel injection, the cut-off valve, which is expediently designed as a magnetically or piezoelectrically controlled valve, is activated correspondingly. This prevents the situation where, when the injection nozzle is closed, the injection pump feeds into a closed system and the pressure rises in an uncontrolled way. In addition, a safety valve (pressure limitation) may also be mounted.

A simpler alternative to the magnetically or piezoelectrically controlled valve is a pressure relief valve which prevents the maximum pressure from being exceeded when the injection nozzle is closed.

The injection nozzle used is expediently a multi-hole nozzle with relatively small hole diameters, in order to obtain as fine an atomization as possible for early injection and to prevent too great a depth of penetration of the jets. Since a high injection pressure is used for late injection and, moreover, the injection quantity for late fuel injection is lower because of the multi-phase fuel injection, the injection duration for late fuel injection for the formation of a heterogeneous mixture is not too long, even under full load, in spite of the small hole diameter.

In order to control the ignition point of the homogeneous mixture, it is expedient, furthermore, to inject fuel in the form of an ignition jet shortly before top dead center. The high injection pressure should already prevail at the injection point of the ignition jet.

The auto-ignition of many fuels generally takes place in two steps. First, there is a reaction with a slight temperature increase, which leads to the termination of chain branching and is designated as cool-flame combustion. Subsequently, after a certain induction period, a second ignition takes place with following high-temperature oxidation, so-called hot-flame combustion. When the entire content of the working space burns simultaneously, as is largely the case with homogeneous, auto-ignited combustion, cool-flame combustion and hot-flame combustion can be detected clearly in the pressure profile and in the heating profile calculated therefrom. A homogenized lean fuel/air mixture can be ignited successfully by means of an extremely small ignition quantity of the same fuel when the highly homogenized fuel/air mixture is already in an activated state before ignition-jet injection. It is therefore advantageous for the ignition jet to be injected between cool-flame combustion and hot-flame combustion.

Cool-flame combustion may be influenced by the geometric compression ratio, the effective compression ratio, the fuel, the inlet temperature, the pressure in the suction pipe (air ratio) and the air movement (swirl, tumble) and also by exhaust-gas recirculation or exhaust-gas retention and the like, in such a way that, for that range of load and of rotational speed which is provided for homogeneous combustion, only cool-flame combustion takes place without ignition-jet injection or cool-flame combustion lasts as long a possible or there is a long interval between cool-flame combustion and hot-flame combustion. Furthermore, a premature start of cool-flame combustion is also to be prevented by means of a suitable choice of the abovementioned parameters.

Under some circumstances, it is possible, in multi-phase fuel injection, for a uniform injection pressure to be sufficient, which is then expediently between the lower injection pressure for early fuel injection and the higher injection pressure for late fuel injection. In this case, the hole diameter of the injection nozzle must be coordinated with the injection pressure in such a way that, during early fuel injection, the fuel does not accrete on the wall of the combustion space and, during later fuel injection, the injection time does not become too long. In order to reduce the depth of penetration of the inflow jets and consequently avoid the accretion of fuel on the wall of the combustion space during early fuel injection, the injection of the fuel may be timed in the early phase for the formation of a homogeneous mixture.

BRIEF DESCRIPTION OF THE DRAWINGS

The description and the claims contain numerous features in combination. A person skilled in the art will expediently also consider the features individually and combine them into appropriate further combinations. Further advantages may be gathered from the following description with reference to the drawings, which illustrate exemplary embodiments of the present invention, in which:

DETAILED DESCRIPTION

Figure 1:
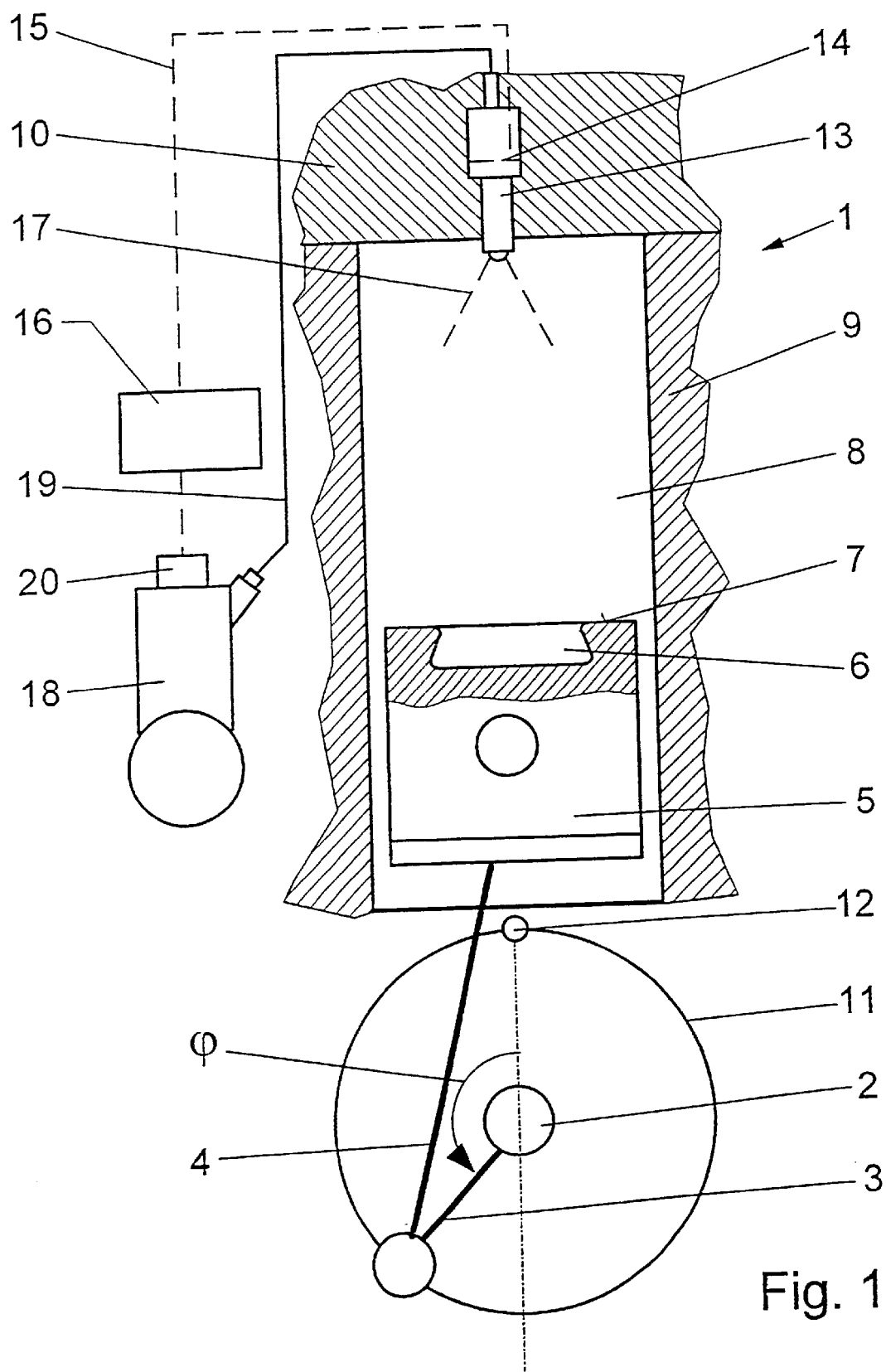
FIG. 1 shows a diagrammatic cross section through a reciprocating-piston internal combustion engine.

With reference to FIG. 1, in a reciprocating-piston internal combustion engine 1, a piston 5, which is guided in a cylinder 9, drives onto crank 3 of a crankshaft 2 via a connecting rod 4. A working space 8, which includes a piston recess 6 set into piston head 7, is formed in cylinder 9 between the piston 5 and a cylinder head 10.

When crank 3 rotates clockwise on a crank circle 11, the working space 8 decreases in size, the air enclosed in it being compressed. The charge cycle in the working space 8 takes place via gas exchange valves and gas ducts in cylinder head 10 which are not illustrated in any more detail.

When a top dead center 12 of crank 3 is reached, the end of compression is reached, at which working space 8 assumes its smallest volume and the highest compression pressure and highest compression temperature are attained. The current position of piston 5 in relation to cylinder head 10 is determined by the crank angle $\phi$ with respect to top dead center 12.

An injection nozzle 13 is arranged in cylinder head 10 centrally in relation to the base area of cylinder 9 and projects a little into the working space 8. The injection nozzle may be activated via a signal line 15 and an actuator 14 by an electronic control unit 16, the engine control. The injection jets are designated by 17.

In order to generate pressure modulation in a working cycle, the following injection systems are optionally available:

a) First Configuration:

Reciprocating-piston pump (for example, insertable pump, unit injector, in-line injection pump, distributor injection pump), the piston of which is driven by a camshaft having a double cam and which feeds fuel to the electronically controllable injection valve, a cut-off valve being arranged between the injection pump and the respective injection nozzle.

b) Second Configuration:

CR system, in which there is arranged between the high-pressure accumulator and the electronically controllable injection valve a quick-switching magnetically or piezoelectrically controlled valve, with the aid of which the pressure level in the fuel delivery line to the injection valve can be regulated.

c) Third Configuration:

Electronically controllable injection system with hydraulic pressure boosting (for example, HEUI B by Caterpillar). The oil pressure is switched to a booster piston with the aid of a quick-switching magnetically or piezoelectrically controlled valve (for example, 3/2-way valve). By an appropriate double supply of current to the quick-switching valve, the injection pressure can be varied when different injection events occur.

Figure 2:
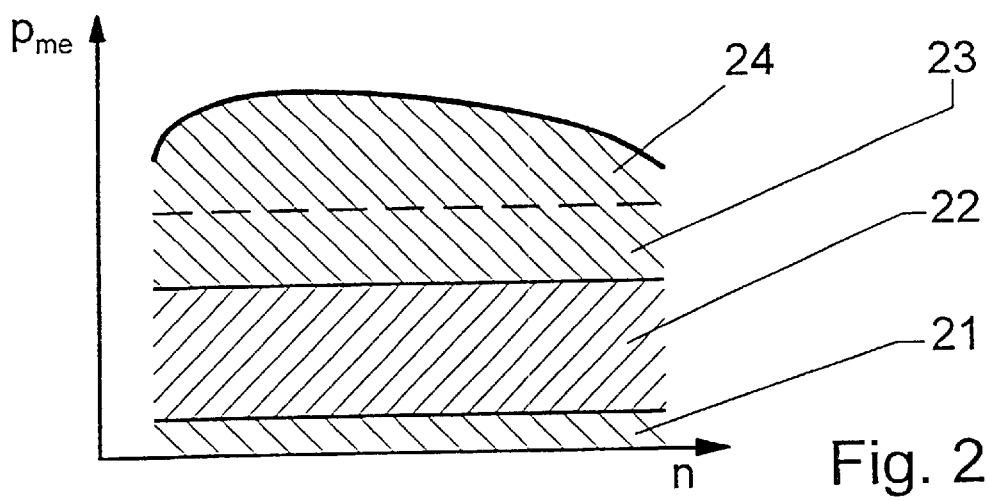
FIG. 2 shows a diagrammatic operating characteristic map with the formation of a heterogeneous mixture in a lower part-load range, in an upper part-load range and in the full-load range.
Figure 3:
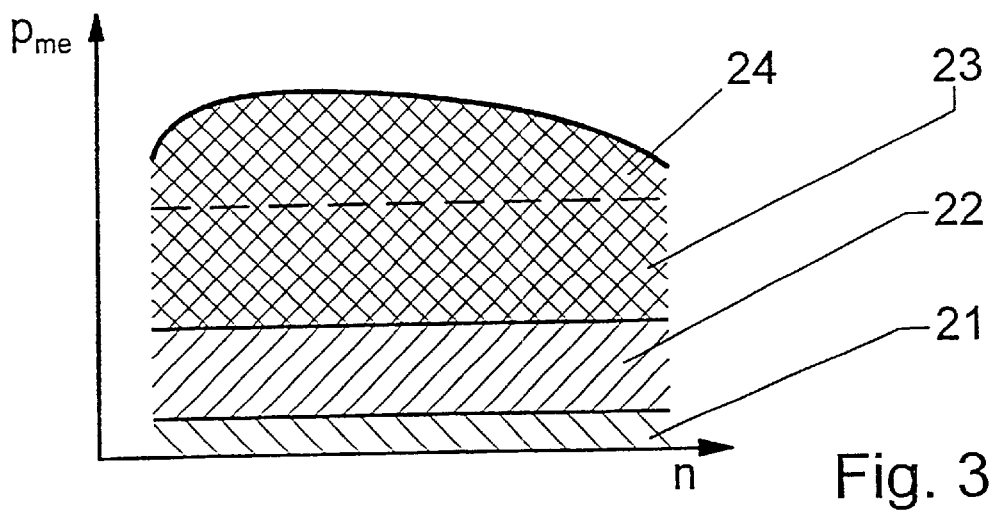
FIG. 3 shows a variant of FIG. 2 with multi-phase fuel injection in an upper part-load range and in the full-load range.
Figure 4:
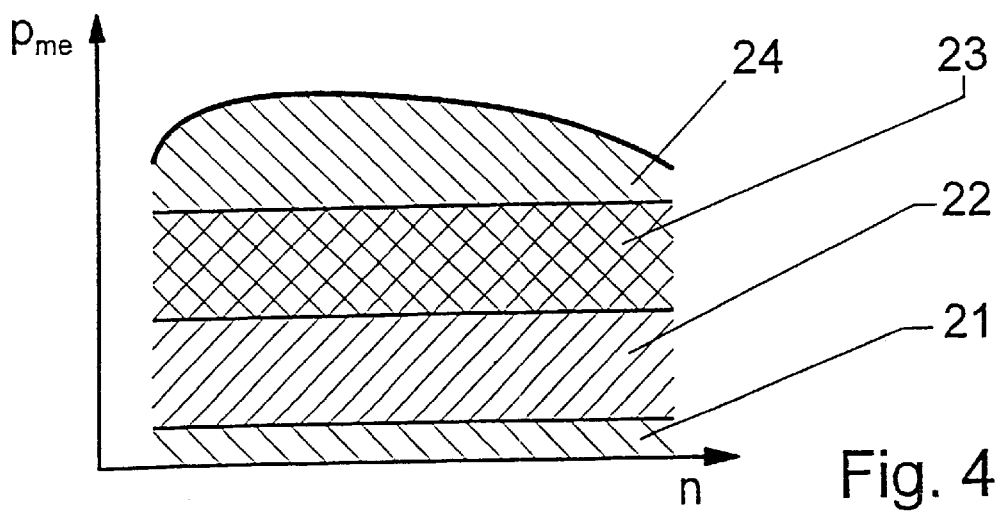
FIG. 4 shows a variant of FIG. 2 with multi-phase fuel injection in an upper part-load range and with the formation of a heterogeneous mixture in the full-load range.
Figure 5:
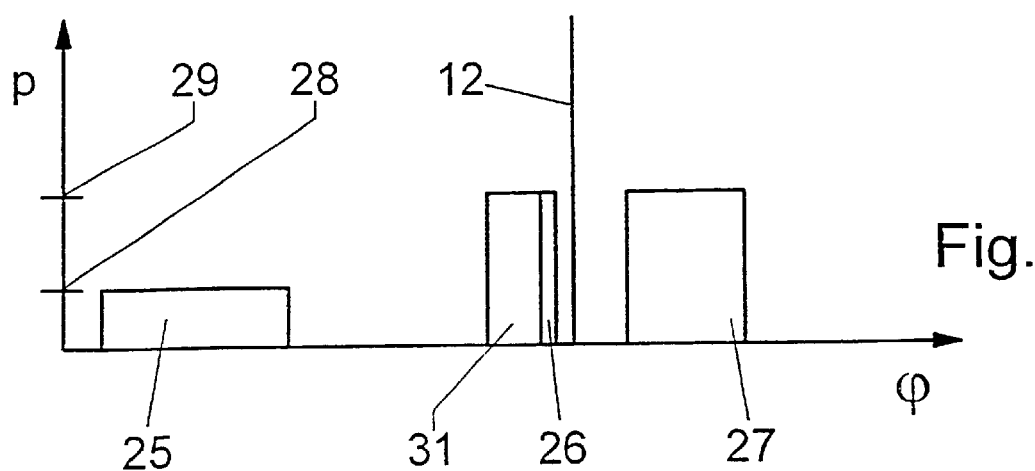
FIG. 5 shows a diagrammatic graph of an injection pressure p against a crank angle $\phi$.
Figure 8:
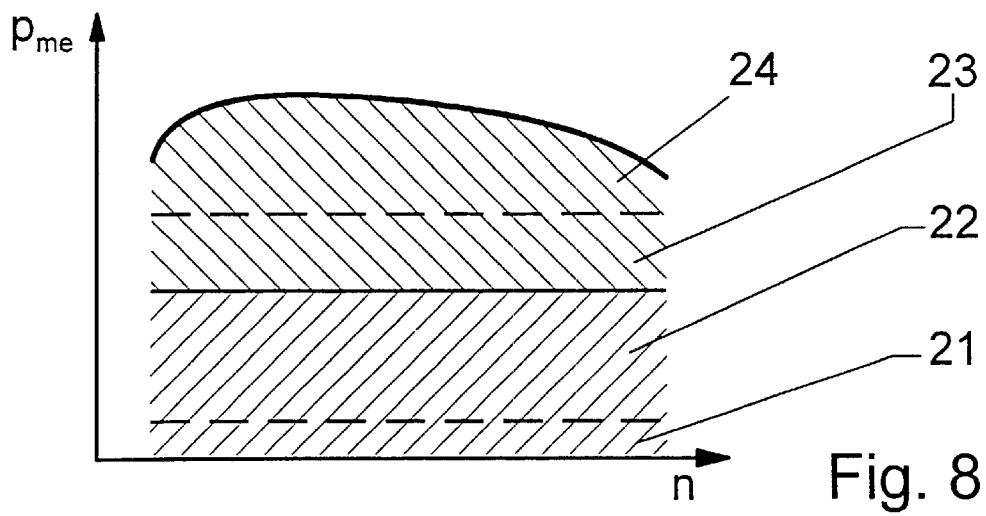
FIG. 8 shows a variant of FIG. 2 with the formation of a locally homogeneous mixture (stratification) in a lower part-load range.
Figure 9:
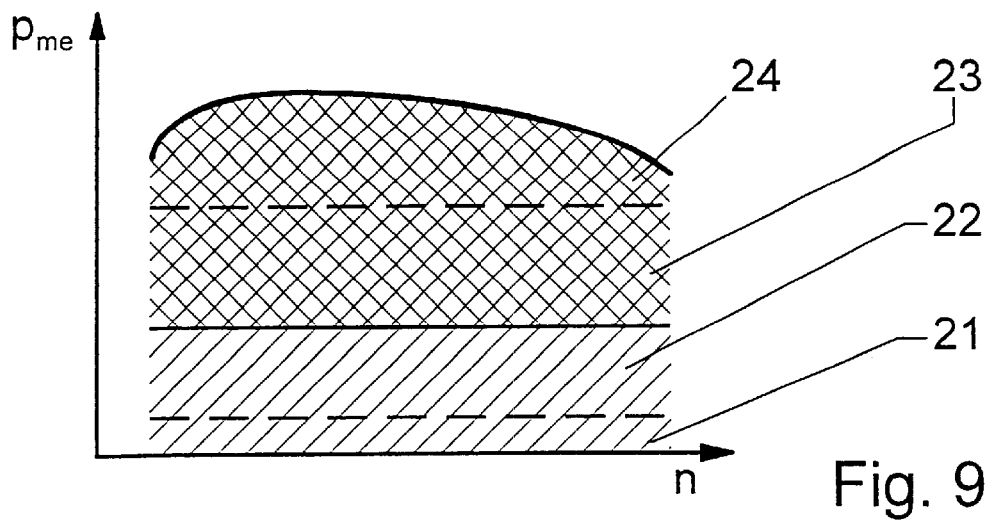
FIG. 9 shows a variant of FIG. 3 with the formation of a locally homogeneous mixture (stratification) in a lower part-load range.
Figure 10:
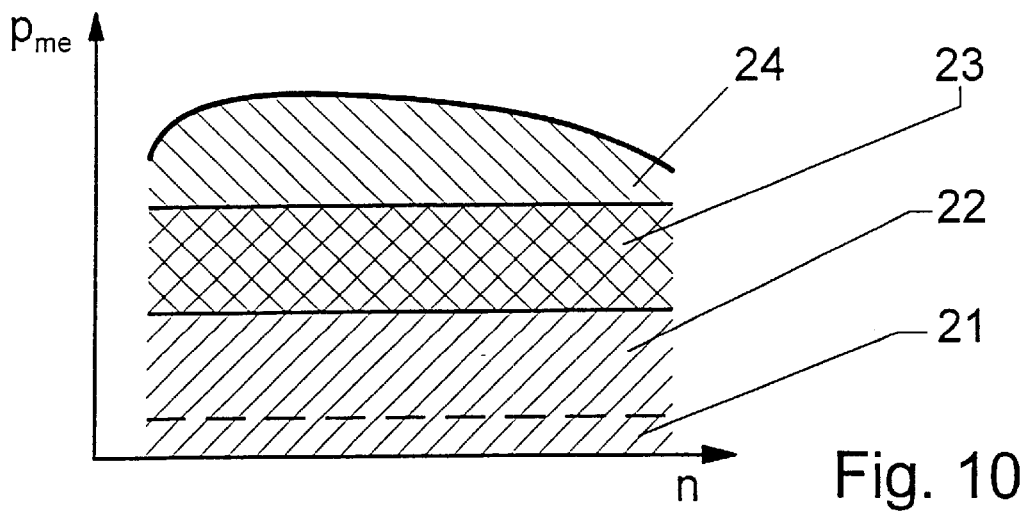
FIG. 10 shows a variant of FIG. 4 with the formation of a locally homogeneous mixture (stratification) in a lower part-load range.

FIGS. 2 to 4 show diagrammatic characteristic maps with a low part-load range 21, a middle part-load range 22, an upper part-load range 23 and a full-load range 24, it being possible for the ranges to merge smoothly into one another. In low part-load range 21, for the formation of a heterogeneous mixture, the fuel is injected in a phase 31 in the vicinity of top dead center 12. Optionally, in lower load range 21, an ignitable homogeneous mixture may be formed locally, even when the injection is very early (180° to 20° crank angle $\phi$ before top dead center 12), by defined charge stratification, via controlled coordination of air movement in the cylinder and injection pressure combined with timed injection, in a similar to the direct-injection gasoline engine, so that, even in this load range, homogeneous combustion can be produced (FIGS. 8 to 10). In subsequent middle part-load range 22, the fuel is injected in an early phase 25, approximately 180°–20° crank angle (p before top dead center 12, with a lower injection pressure 28 (FIG. 5) or a medium injection pressure 30 (FIG. 6), medium injection pressure 30 being between low injection pressure 28 and higher injection pressure 29. Low injection pressure 28 and medium injection pressure 30 are selected and coordinated with the configuration of injection nozzle 13 in such a way that the formation of a homogeneous mixture takes place and the injected fuel does not accrete on the walls of working space 8.

Above middle part-load range 22, in upper part-load range 23, the fuel may be injected in a multi-phase manner (FIG. 4) or, for the formation of a heterogeneous id mixture, in a phase 31 or 27 in the vicinity of top dead center 12 (FIG. 2). When the fuel is injected in a phase 31 or 27 in upper part-load range 23, the fuel is also injected in subsequent full-load range 24 in a phase 31 or 27 (FIG. 2). By contrast, when the fuel is injected in a multi-phase manner in upper part-load range 23, then, in subsequent full-load range 24, the fuel may be injected either likewise in a multi-phase manner (FIG. 3) or in a phase 31 or 27 in the vicinity of top dead center 12 for the formation of a heterogeneous mixture (FIG. 4).

Figure 6:
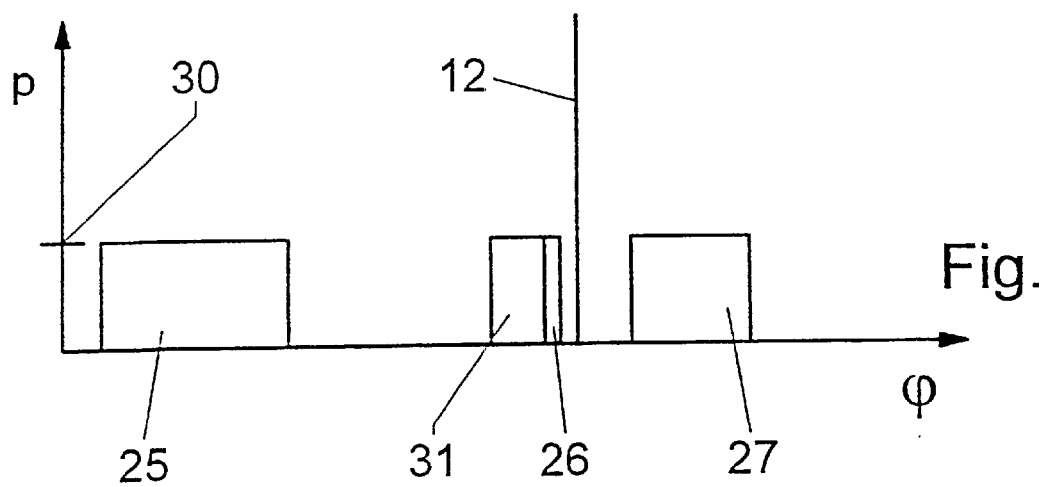
FIG. 6 shows a variant of FIG. 5.
Figure 7:
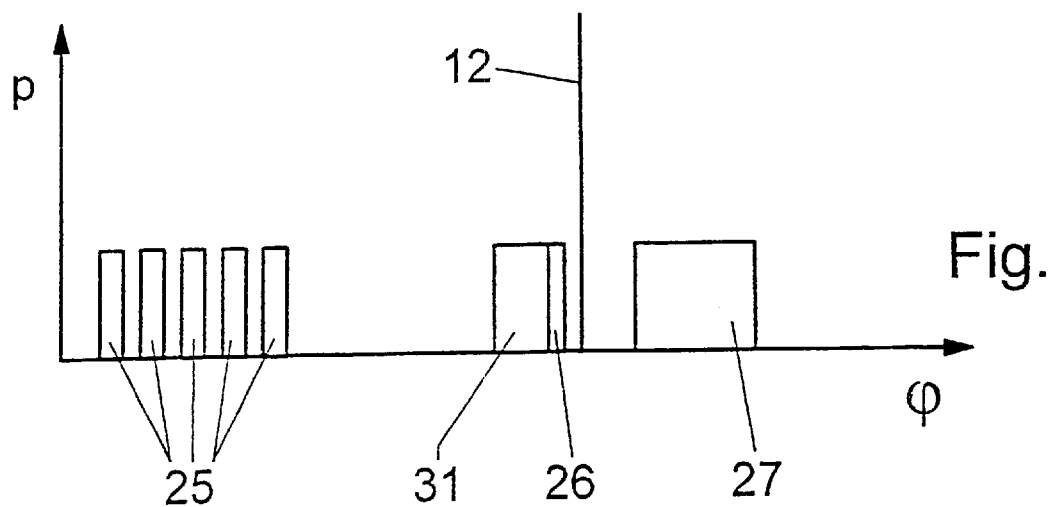
FIG. 7 shows a variant of FIG. 6.

In the multi-phase fuel injection in upper part-load range 23 and in full-load range 24, part of the fuel to be injected is injected, during an early phase 25, with a lower pressure 28 (FIG. 5) or a medium pressure 30 (FIG. 6) or in a timed manner (FIG. 7). This gives rise to a largely homogeneous fuel/air mixture which reacts partly in a cool-flame combustion process up to top dead center 12. In a second phase 31 or 27 in the vicinity of top dead center 12, the remaining fuel is injected with a higher injection pressure 29 (FIG. 5) or a medium injection pressure 30 (FIG. 6). In the version according to FIG. 7, the injection pressure in phases 31 or 27 may be equal to that in phase 25 or above this.

Injection in the region of top dead center 12 serves for the formation of a heterogeneous mixture and prevents knocking combustion in upper part-load range 23 and in full-load range 24. In order to control the ignition point of the homogeneous mixture, it is expedient to inject an ignition-jet quantity of fuel into the working space in a phase 26 shortly before top dead center 12. The cool-flame combustion of the homogeneous mixture should still persist at this point, so that hot-flame combustion can be initiated by means of the ignition jet.

What is claimed is:

1. A method for operating a reciprocating-piston internal combustion engine having a crank angle and an injector nozzle for directly injecting fuel into a working space of a cylinder, the working space including a recess of a piston, the engine capable of operating in a lower part-load range, a middle part-load range, an upper part-load range, and a full-load range, the method comprising:

during the lower part-load range, injecting a first amount of the fuel centrally into the working space at a first injection pressure at a time shortly before the crank angle reaches a top dead center position so as to produce a heterogeneous mixture;

during the middle part-load range, injecting a second amount of the fuel into the working space at a second injection pressure at a time when the crank angle is between 180° and 20° before the top dead center position so as to produce a homogeneous mixture; and during at least one of the upper part-load range and the full-load range, injecting a portion of a third amount of the fuel into the working space at a third injection pressure at a time when the crank angle is within a range between 180° and 20° before the top dead center position so as to produce a homogeneous mixture and a remainder of the third amount of the fuel into the working space at a fourth injection pressure at a time when the piston is approximately at the top dead center position so as to produce a heterogeneous mixture.

2. A method for operating a reciprocating-piston internal combustion engine having a crank angle and an injector nozzle for directly injecting fuel into a working space of a cylinder, the working space including a recess of a piston, the engine capable of operating in a lower part-load range, a middle part-load range, an upper part-load range, and a full-load range, the method comprising:

during the lower part-load range, forming an ignitable homogeneous mixture locally by defined charge stratification using controlled coordination of air movement in the working space and injection pressure combined with timed injection at a time when the crank angle is between 180° and 20° before the top dead center position so as to produce a homogeneous combustion;

during the middle part-load range, injecting a second amount of the fuel into the working space at a second injection pressure at a time when the crank angle is between 180° and 20° before the top dead center position so as to produce a homogeneous mixture; and during at least one of the upper part-load range and the fall-load range, injecting a portion of a third amount of the fuel into the working space at a third injection pressure at a time when the crank angle is within a range between 180° and 20° before the top dead center position so as to produce a homogeneous mixture and a remainder of the third amount of the fuel into the working space at a fourth injection pressure at a time when the piston is approximately at the top dead center position so as to produce a heterogeneous mixture.

3. The method as recited in claim 1 wherein the second and third injection pressures are lower injection pressures and the first and fourth injection pressures are higher injection pressures.

4. The method as recited in claim 1 wherein the first, second, third, and fourth injection pressures have an approximately equal value between a lower injection pressure and a higher injection pressure.

5. The method as recited in claim 2 wherein the forming of the of the ignitable homogeneous mixture locally is performed in a timed manner.

6. The method as recited in claim 1 wherein, during the upper-part load range, the remainder of the third amount of fuel is injected into the recess of the piston.

7. The method as recited in claim 2 wherein, during the upper-part load range, the remainder of the third amount of fuel is injected into the recess of the piston.

8. The method according to claim 1 wherein during the lower and middle part-load ranges, injecting a fourth amount of fuel at a time shortly before the crank angle reaches a top dead center position.

9. The method as recited in claim 6 wherein the remainder of the third amount of fuel is injected between a cool-flame combustion and a hot-flame combustion.

10. The method as recited in claim 8, wherein a geometric compression ratio, an effective compression ratio, a fuel, an inlet temperature, a pressure in the suction pipe, an air movement, and one of an exhaust-gas recirculation and exhaust-gas retention are selected and coordinated with one another in such a way that, for a range of load and a range of rotational speed for homogeneous combustion, only cool-flame combustion takes place without ignition-jet injection so as to prevent a premature start of cool-flame combustion.

11. The method as recited in claim 8, wherein a geometric compression ratio, an effective compression ratio, a fuel, an inlet temperature, a pressure in the suction pipe, an air movement, and one of an exhaust-gas recirculation and exhaust-gas retention are selected and coordinated with one another in such a way that, for a range of load and a range of rotational speed for homogeneous combustion, cool-flame combustion lasts as long as possible so as to prevent a premature start of cool-flame combustion.

12. The method as recited in claim 8, wherein a geometric compression ratio, an effective compression ratio, a fiuel, an inlet temperature, a pressure in the suction pipe, an air movement, and one of an exhaust-gas recirculation and exhaust-gas retention are selected and coordinated with one another in such a way that, for a range of load and a range of rotational speed for homogeneous combustion, there is a long interval between cool-flame combustion and hot-flame combustion so as to prevent a premature start of cool-flame combustion.

13. An injection system for a reciprocating-piston internal combustion engine having a crank angle and an injector nozzle for directly injecting fuel into a working space of a cylinder, the working space including a recess of a piston, the engine capable of operating in a lower part-load range, a middle part-load range, an upper part-load range, and a full-load range, the injection system comprising:

a reciprocating piston pump for generating pressure modulation in a working cycle including a piston driven by a camshaft having a double cam for feeding fuel to the electronically controllable injection valve;

an injection nozzle; and a cut-off valve disposed between the reciprocating piston pump and the injection nozzle, the reciprocating piston pump being capable of, during the lower part-load range, injecting a first amount of the fuel centrally into the working space at a first injection pressure at a time shortly before the crank angle reaches a top dead center position so as to produce a heterogeneous mixture; during the middle part-load range, injecting a second amount of the fuel into the working space at a second injection pressure at a time when the crank angle is between 180° and 20° before the top dead center position so as to produce a homogeneous mixture; and during at least one of the upper part-load range and the fill-load range, injecting a portion of a third amount of the fuel into the working space at a third injection pressure at a time when the crank angle is within a range between 180° and 20° before the top dead center position so as to produce a homogeneous mixture and a remainder of the third amount of the fuel into the working space at a fourth injection pressure at a time when the piston is approximately at the top dead center position so as to produce a heterogeneous mixture.

14. An injection system for a reciprocating-piston internal combustion engine having a crank angle and an injector nozzle for directly injecting fuel into a working space of a cylinder, the working space including a recess of a piston, the engine capable of operating in a lower part-load range, a middle part-load range, an upper part-load range, and a full-load range, the injection system comprising:

a CR system for generating pressure modulation in a working cycle, the CR system including a high pressure accumulator, an electronically controllable injection valve including a fuel delivery line, a quick-switching magnetically or piezoelectrically controlled valve disposed between the accumulator and the injection valve and capable of aiding regulation of a pressure level in the fuel delivery line, the CR system being capable of, during the lower part-load range, injecting a first amount of the fuel centrally into the working space at a first injection pressure at a time shortly before the crank angle reaches a top dead center position so as to produce a heterogeneous mixture; during the middle part-load range, injecting a second amount of the fuel into the working space at a second injection pressure at a time when the crank angle is between 180° and 20° before the top dead center position so as to produce a homogeneous mixture; and during at least one of the upper part-load range and the full-load range, injecting a portion of a third amount of the fuel into the working space at a third injection pressure at a time when the crank angle is within a range between 180° and 20° before the top dead center position so as to produce a homogeneous mixture and a remainder of the third amount of the fuel into the working space at a fourth injection pressure at a time when the piston is approximately at the top dead center position so as to produce a heterogeneous mixture.

15. An injection system for a reciprocating-piston internal combustion engine having a crank angle and an injector nozzle for directly injecting fuel into a working space of a cylinder, the working space including a recess of a piston, the engine capable of operating in a lower part-load range, a middle part-load range, an upper part-load range, and a full-load range, the injection system comprising:

an electronically controllable injection system with hydraulic pressure boosting, the electronically controllable injection system being capable of, during the lower part-load range, injecting a first amount of the fuel centrally into the working space at a first injection pressure at a time shortly before the crank angle reaches a top dead center position so as to produce a heterogeneous mixture; during the middle part-load range, injecting a second amount of the fuel into the working space at a second injection pressure at a time when the crank angle is between 180° and 20° before the top dead center position so as to produce a homogeneous mixture; and during at least one of the upper part-load range and the full-load range, injecting a portion of a third amount of the fuel into the working space at a third injection pressure at a time when the crank angle is within a range between 180° and 20° before the top dead center position so as to produce a homogeneous mixture and a remainder of the third amount of the fuel into the working space at a fourth injection pressure at a time when the piston is approximately at the top dead center position so as to produce a heterogeneous mixture.

16. The injection system as recited in claim 13 wherein the cut-off valve includes a pressure relief valve.

17. The injection system as recited in claim 13 wherein the cut-off valve includes an electronically controllable magnetically or piezoelectrically controlled valve.

18. The injection system as recited in claim 13 wherein the injection nozzle includes a multi-hole nozzle with relative small hole diameters.

* * * * *

UNITED STATES PATENT AND TRADEMARK OFFICE
CERTIFICATE OF CORRECTION

PATENT NO. : 6,505,601 B1 Page 1 of 1
DATED : January 14, 2003
INVENTOR(S) : Jorach et al.

It is certified that error appears in the above-identified patent and that said Letters Patent is hereby corrected as shown below:

Column 1,
Line 14, please delete "modem" and insert -- modern --;
Line 40, please delete "bums" and insert -- burns --;
Line 64, please delete "fulel" and insert -- fuel --;

Column 3,
Line 27, please delete "fulel" and insert -- fuel --.

Signed and Sealed this

Thirtieth Day of March, 2004

JON W. DUDAS
*Acting Director of the United States Patent and Trademark Office*